July 31, 1951 — B. SCHLOSS ET AL — 2,562,645
ELECTRICAL SCALING CIRCUIT
Filed Sept. 4, 1945 — 2 Sheets-Sheet 1

Witnesses:
William J. Ruano
Henry W. Johnson

Inventors:
Benjamin Schloss
Sidney Robinson
By: Robert A. Lavender
Attorney

July 31, 1951 B. SCHLOSS ET AL 2,562,645
ELECTRICAL SCALING CIRCUIT
Filed Sept. 4, 1945 2 Sheets-Sheet 2
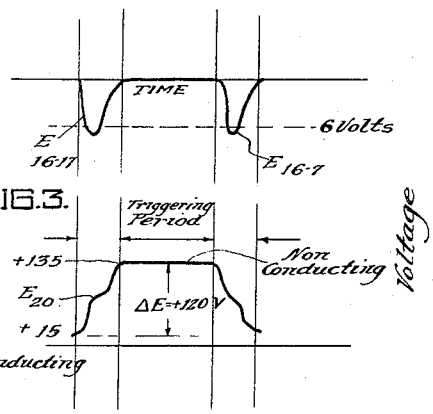
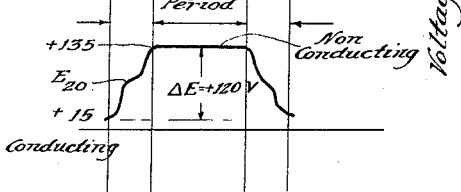
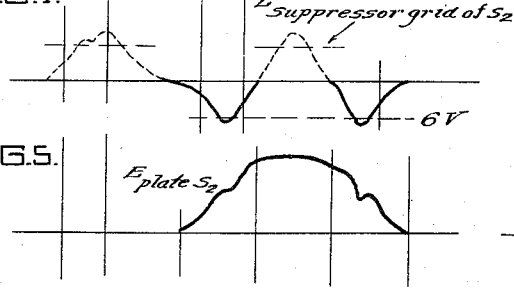
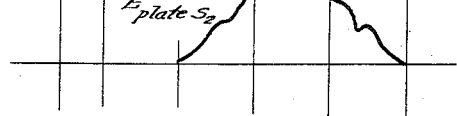
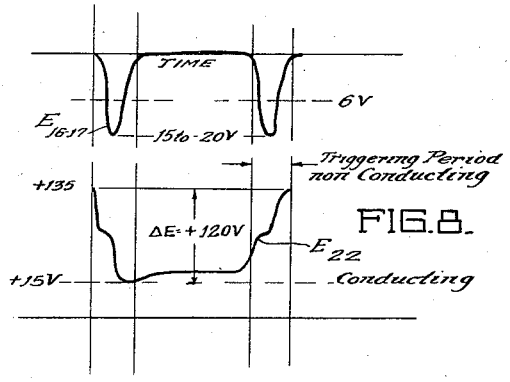
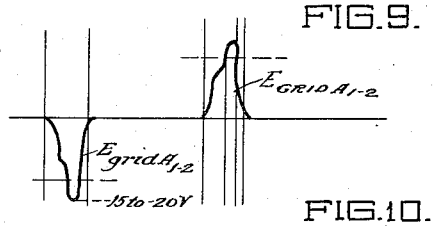
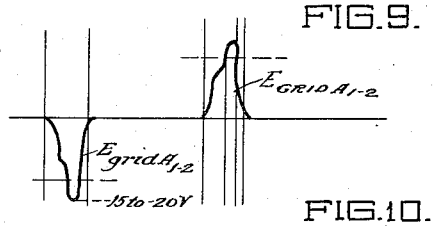
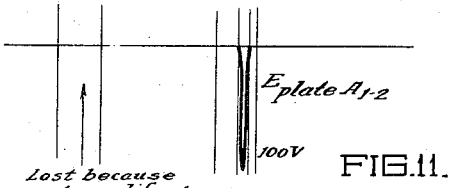
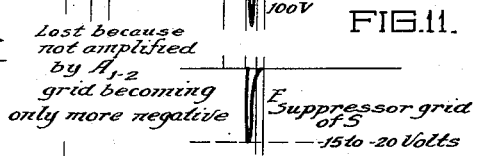
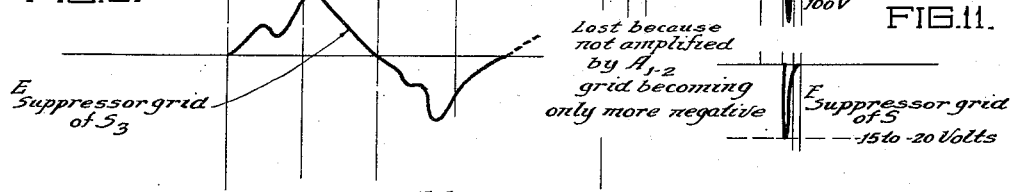
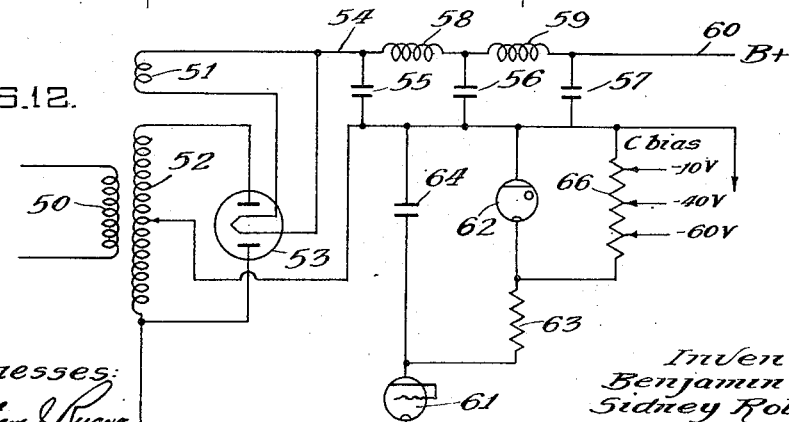
Inventors:
Benjamin Schloss
Sidney Robinson
By Robert K. Lavender
Attorney Patented July 31, 1951

2,562,645

UNITED STATES PATENT OFFICE 2,562,645

ELECTRICAL SCALING CIRCUIT

Benjamin Schloss and Sidney Robinson, New York, N. Y., assignors to the United States of America as represented by the United States Atomic Energy Commission Application September 4, 1945, Serial No. 614,401

8 Claims. (Cl. 250—27)

Our invention relates to a scaling circuit. More specifically, it relates to a multiple scaling circuit comprising a plurality of scaling stages connected in cascade, each stage giving a single output pulse for every pair of successive input pulses.

A multiple scaling circuit may be used, for example, for radiation measurements to scale down pulses received from a Geiger-Müller tube to a low pulse rate so that they may be readily measured or recorded mechanically. For example, in a 6 stage, scale of 64, multiple scaling circuit, illustrated in the drawing, for every 64 pulses originating in the Geiger-Müller tube, only a single output pulse appears at the output of the last scaling stage or in the recorder.

In the past, various types of multiple circuits have been devised but they have certain disadvantages making them unsuitable for the purposes for which the present invention is desired, among which are instability, difficulty of maintaining adjustment, and the tendency to develop spurious pulses resulting in erroneously high end counts.

An object of our invention is to provide an efficient multiple scaling circuit that is devoid of the above-mentioned disadvantages, that is, to provide a scaling circuit that is highly stable, that remains in adjustment, and that is devoid of spurious pulses, thereby giving a reliable pulse count.

Another object of our invention is to provide a multiple scaling circuit that is designed to give an optimum wave form to the transmitted pulse between successive stages, namely, one that is highly peaked and of relatively short duration.

Other objects and advantages will become more apparent from the following specification taken with the accompanying drawings wherein:

Fig. 1 is a schematic diagram illustrating a 6 stage, scale of 64, multiple scaling circuit embodying the teachings of our invention;

Figs. 2 to 6 inclusive are graphs illustrating various voltage characteristics in a multiple scaling circuit plotted against time wherein only a condenser is used as the coupler between successive stages, more specifically:

Fig. 2 is a graph representing the negative input voltage applied to the suppressor grids of the first stage of a multiple scaling circuit having an interstage condenser coupling;

Fig. 3 is the plate voltage of the conducting tube of the first stage such as derived from the voltage pulses shown in Fig. 2;

Fig. 4 is the suppressor grid voltage applied to the second scaling stage as the result of the voltage shown in Fig. 3;

Fig. 5 is the plate voltage curve of the conducting tube of the second scaling stage such as derived from the voltage characteristic shown in Fig. 4;

Fig. 6 is the voltage applied to the suppressor grid of the third scaling stage such as derived from the voltage characteristic shown in Fig. 5;

Figure 1:
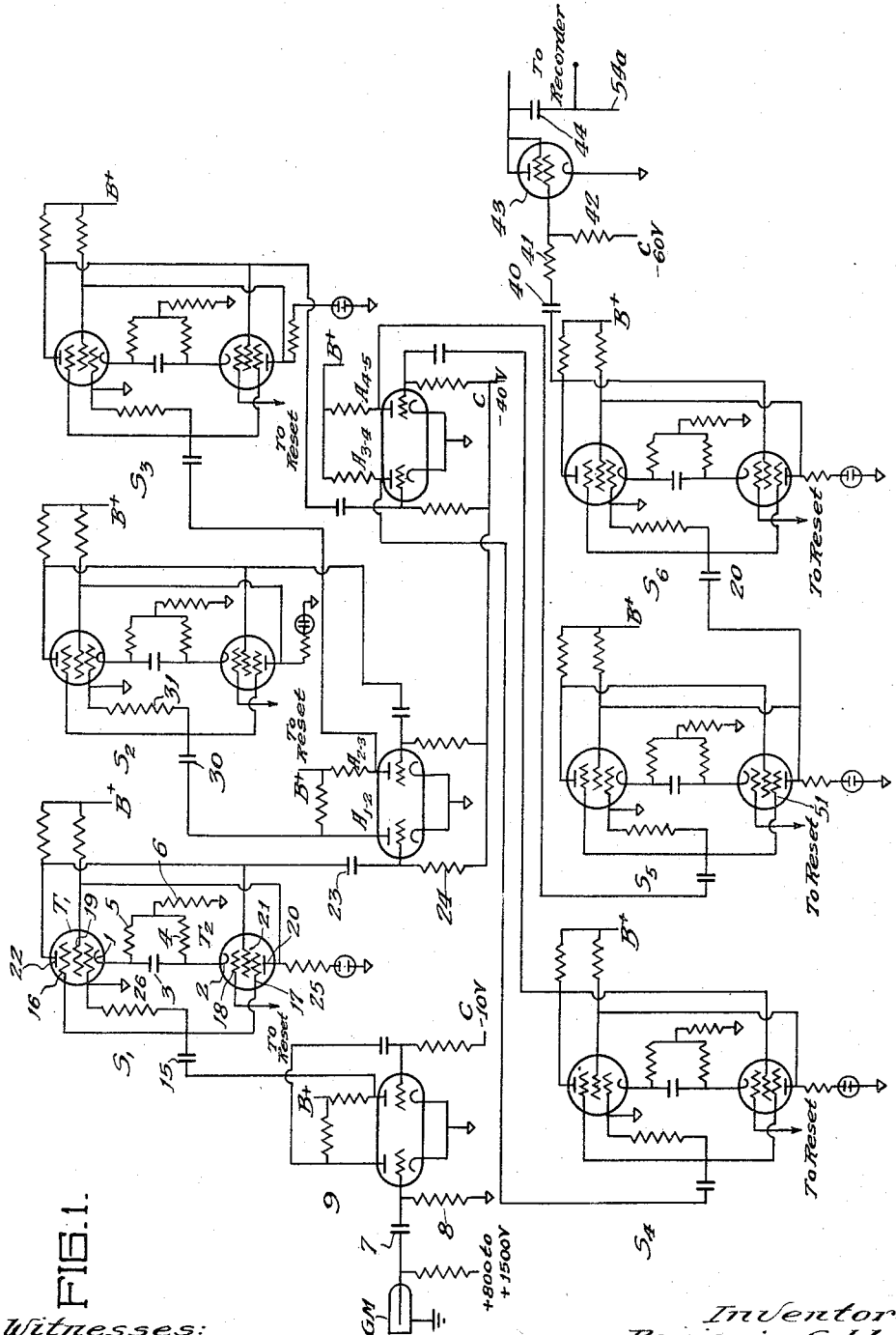

Figs. 7 to 10 inclusive are graphs illustrating the various voltage characteristics in a multiple scaling circuit employing intermediate amplifiers between successive stages in accordance with the teachings of our invention, more specifically:

Fig. 7 illustrates the negative voltage incoming pulses applied to the suppressor grids of the first scaling stage;

Fig. 8 is the plate voltage characteristic of the conducting tube of the first scaling stage;

Fig. 9 represents the differentiated voltage pulse appearing on the grid of the intermediate amplifier between the first and second scaling stages;

Fig. 10 represents the amplified voltage pulse appearing on the output of the intermediate amplifier between the first and second scaling stages;

Fig. 11 represents the differentiated voltage pulse appearing on the suppressor grid of the second scaling stage; and Fig. 12 is a schematic diagram of the power supply for providing the necessary high voltage and negative bias voltages for scaling circuit shown in Fig. 1

Referring more particularly to Fig. 1, $S_1$, $S_2$, $S_3$, $S_4$, $S_5$, and $S_6$ denote six successive scaling stages of a multiple scaling circuit connected in cascade, each stage comprising a pair of alternately triggering discharge tubes, such as, for example, $T_1$ and $T_2$ associated with the first stage $S_1$. Inasmuch as the triggering circuit is the same in each of the six stages, a description of the operation of the triggering circuit of only the first stage $S_1$ will be given. Tubes $T_1$ and $T_2$ are illustrated as pentode tubes such as, for example, type 6SJ7 having cathodes 1 and 2 that are interconnected by a memory circuit comprising condenser 3, and a pair of resistors 4 and 5 connected to ground through a resistor 6. The purpose of the memory circuit is to maintain a difference of bias between tubes $T_1$ and $T_2$ during the triggering action so as to facilitate triggering of the non-conducting tube, as will appear hereinafter. The negative voltage pulses formed by a radiation detector tube, such as, for example, a Geiger-Müller tube GM as the result of gamma or other radiation falling thereon, are applied to the differentiating circuit, comprising condenser 7 and resistor 8 at the input of a preliminary amplifier 9. The preliminary amplifier 9 may be of any well-known type, such as a double triode, type 6SC7 as shown. The triode section of amplifier 9 illustrated on the left has a class A amplifier action and is operated at zero bias while that on the right has a class B amplifying action and is operated at −10 volts bias. Under these conditions, the right triode section is driven to saturation when pulses as low as −0.1 volt are fed to the left section. The preliminary amplifier 9, per se, forms no part of the present invention. Amplified negative voltage pulses at the output of the right hand triode section of the preliminary amplifier 9 are applied to a differentiating circuit including resistor 26 and coupling condenser 15, and the differentiated pulses appear on suppressor grids 16 and 17 of tubes $T_1$ and $T_2$.

The operation of the triggering tubes $T_1$ and $T_2$ is as follows:

Before counting is begun, a positive voltage is applied to the control grid 18 of tube $T_2$ as well as to the control grids of all other corresponding tubes of the six stages by pressing a reset switch (not shown). Counting is therefore begun with tube $T_2$ conducting and tube $T_1$ non-conducting. Conduction of tube $T_2$ is indicated by the extinguished condition of glow discharge tube 25.

The screen grids and plates of tubes $T_1$ and $T_2$ are interconnected, that is, the screen grid 19 of tube $T_1$ is connected to plate 20 of tube $T_2$, and the screen grid 21 of tube $T_2$ is connected to the plate 22 of tube $T_1$. Therefore, the voltages on the plate 22 of tube $T_1$ and on the screen grid 21 of tube $T_2$ are always equal, and the same is true for the voltages on the plate 20 of tube $T_2$ and on the screen grid 19 of tube $T_1$.

Assume now that a negative voltage pulse is applied to the suppressor grids 16 and 17 of tubes $T_1$ and $T_2$. Since tube $T_2$ is conducting, the plate current will fall and the plate voltage of $T_2$ rises. Consequently, the voltage on the screen grid 19 of tube $T_1$ also rises. If this increase in voltage is sufficient to start the flow of plate current in tube $T_1$, the voltage on the plate 22 of tube $T_1$ drops and with it the voltage on screen grid 21 of tube $T_2$. But a dropping screen grid voltage decreases the plate current of tube $T_2$ and causes a further decrease in plate current and a consequent increase in its plate voltage. This causes a repetition of the above process, leading to a further increase in plate current in tube $T_1$ and an additional decrease in plate current of tube $T_2$. The entire action if unretarded is practically instantaneous and ends with a reversal of the initial circuit conditions namely, with tube $T_1$ conducting and tube $T_2$ non-conducting. However, as long as the incoming negative voltage pulse remains on the suppressor grid of tube $T_1$, the plate current of tube $T_1$ is prevented from rising to its maximum value, so that the duration of the triggering action is dependent upon the duration of the triggering pulse. For this reason the triggering pulse width should be small.

The voltage required to trigger the circuit is reduced by the action of the memory circuit. This circuit may consist, for example, of a 0.01 mf. condenser 3 and two 800 ohm resistors 4 and 5 connected to ground through a 1500 ohm resistor 6. The memory circuit keeps the non-conducting tube $T_1$ at a smaller bias than the conducting tube $T_2$ so that a comparatively small increase in screen grid voltage can start plate current flow in tube $T_1$. For example, the control grid of non-conducting tube $T_1$ is biased at −3 volts while that of conducting tube $T_2$ is biased at −4.5 volts. The bias on both tubes is held constant by the memory circuit until the triggering action has been completed after which memory condenser 3 discharges and the bias voltages are reversed, that is, tube $T_1$ becomes biased at −4.5 volts while tube $T_2$ becomes biased at −3 volts. If a memory circuit were not used, and the biases were not held constant, a decreasing bias on tube $T_2$ would otherwise cause an increase in plate current of tube $T_2$ at the same time that the current was being decreased by the triggering action, thus opposing the triggering of the circuit. The resolution time of the memory circuit, which is roughly the length of time that the bias voltages are kept constant, must be greater than the time required for completion of the triggering action otherwise the circuit will not trigger.

Tube $T_1$ is connected to the next stage $S_2$ by an intermediate amplifier $A_{1-2}$ comprising a triode section illustrated at the left of a double triode tube. At the input of intermediate amplifier $A_{1-2}$ is provided a differentiating circuit comprising condenser 23 and resistor 24. Referring to Figs. 7 to 11 inclusive, when tube $T_2$ is conducting and the scaling stage $S_1$ is triggered by an incoming negative voltage pulse, a decreasing positive voltage appears at the plate of tube $T_1$. From this the differentiating circuit, namely, condenser 23 and resistor 24, forms a negative pulse, which merely makes the grid bias of amplifier $A_{1-2}$ more negative and therefore is not translated through the intermediate amplifier $A_{1-2}$ to the next scaling stage. However, the next triggering pulse applied to the first scaling stage $S_1$ produces a rising positive voltage at the plate 22 of tube $T_1$ and from this changing voltage, a positive pulse is formed by the action of the differentiating circuit comprising the coupling condenser 23 and resistor 24. The positive pulse will be amplified by intermediate amplifier $A_{1-2}$ and changed in phase by 180°, therefore appearing at the output of intermediate amplifier $A_{1-2}$ as a negative pulse that is applied to the second stage $S_2$ through a differentiating circuit. In this manner, each stage is triggered only once for every two pulses received by its preceding stage so that the ratio of the number of triggering pulses at the output of the scaling circuit to the number of triggering pulses at the input is $$\frac{1}{2^n}$$

where $n$ = the number of stages.

The outstanding feature of our invention is the provision of intermediate amplifiers—$A_{1-2}$, $A_{2-3}$, $A_{3-4}$, and $A_{4-5}$ between successive stages of the multiple scaling circuit, for example, between stages $S_1$ to $S_5$, inclusive. An intermediate amplifier is unnecessary for the coupling between stages $S_5$ and $S_6$ inasmuch as the amplification involved will not be sufficient to cause erroneous operation and the output of $S_6$ is not used to form a triggering pulse in a scaling stage. The coupling between stages $S_5$ and $S_6$ is, therefore, made through a coupling condenser 20.

The advantages of the use of intermediate amplifiers in accordance with our invention may be best understood by comparing the circuit behaviour with that obtained in a multiple scaling circuit wherein all the successive stages are coupled by condensers, such as condenser 20 shown between stages $S_5$ and $S_6$.

Figs. 2 to 6, inclusive, illustrate various voltage characteristics in a multiple scaling circuit employing coupling condensers between each of the successive stages such as shown between stages $S_5$ and $S_6$. In using coupling condensers between the successive stages, it is necessary to make the height of the incoming negative voltage pulse very close to the minimum required triggering voltage of the triggering tubes in order to obtain smooth plate voltage curves. Increasing the size of the pulse appreciably above triggering height would otherwise produce plateaus in the plate voltage curves whose widths are increased and whose slopes are decreased with increase of the height of the triggering pulses resulting in very spurious differentiated pulses. Fig. 2 shows such incoming, negative voltage pulses, such as applied to suppressor grids 16 and 17 of stage $S_1$, which pulses are slightly beyond the required triggering height such as, for example, 6 volts indicated by dotted horizontal lines.

Fig. 3 shows the plate voltage characteristic, which is substantially a square wave, of the pulse transmitting, conducting tube of stage $S_1$. It will be noted that the plate voltage, when the tube is conducting, is about +15 volts, whereas it is about +135 volts when the tube is non-conducting and that $\Delta E$, that is, the voltage change necessary for converting the tube from a non-conducting condition to a conducting condition, is the height of the substantially square wave shown in Fig. 3 being 120 volts. Fig. 4 shows the voltage appearing on the suppressor grid in stage $S_2$. The positive voltage pulses, such as indicated in dotted lines, will have no subsequent effect. It will be noted that the voltage pulses are not as high as those shown in Fig. 2 and that the pulse width is appreciably greater than that of the incoming pulse as shown in Fig. 2. Fig. 5 is the plate voltage characteristic of the pulse transmitting, conducting tube in stage $S_2$. It will be noted that the shape of the triggering portion of the curve, that is the falling portion of the curve, is gentler than that shown in Fig. 3, or stated differently, the duration of the triggering action is longer than that shown in Fig. 3. Fig. 6 is the voltage appearing on the suppressor grid of the pulse transmitting, conducting tube in stage $S_3$ which is similar in shape to that of the previous stage $S_2$ as shown in Fig. 4, but is of smaller height and greater width. It will be seen, therefore, that by going through the successive scaling stages, the height of the triggering pulses becomes smaller and smaller whereas the width of the triggering pulse becomes wider and wider. This is objectionable because there is a great danger that the transmitted pulse, especially through the latter stages, may decrease in height to such an extent as to fail to trigger the succeeding stage. As the pulse width becomes greater, it is necessary to increase the resolution time of the memory circuit so as to insure that the pulse width is less than such resolution time, otherwise the circuit cannot be triggered. Stated differently, the outstanding disadvantage of condenser coupling between successive scaling stages is that the shape of the triggering pulse is entirely dependent on the shape of the output pulse of the previous stage, hence the entire wave form, including its undesirable features, such as increased pulse width, plateau formation, etc., are progressively amplified through succeeding stages giving a very poor triggering pulse in the latter stages, namely one that is relatively wide and of a height which may be too small to effect triggering, also one having spurious pulses thus resulting in an erroneous count. The ideal triggering pulse is one that is of exceedingly small width and of substantial height above triggering. As indicated previously, the best operation of a condenser coupled, multiple scaling circuit is obtained by providing an incoming negative voltage pulse that is only slightly above triggering voltage as shown in Fig. 2. This results in very critical and unstable operation of the circuit inasmuch as any variation in the B+ voltage, change in load resistance, aging of the tube, or change in the cathode bias will cause a change in the required triggering voltage and is apt to make the following stage fail to trigger. Also, by virtue of the inherent tendency of the triggering voltages to become wider as successive stages are traversed, the stages of the circuit will become too slow in response to accurately detect or translate high frequency pulses.

The above-mentioned disadvantages in the use of a coupling condenser between successive stages are overcome by using an interstage amplifier between successive stages so as to make the height and width of the triggering pulse independent of the characteristics of the voltage curve of the preceding scaling stage, in accordance with our invention, as will appear from the following analysis of the wave forms produced by such interstage amplifiers.

Fig. 7 represents incoming differentiated negative voltage pulses such as appear on the suppressor grids 16 and 17 of tubes $T_1$ and $T_2$ in Fig. 1. A voltage pulse height appreciably higher than the triggering height such as, two or three times the triggering height, may be used. The resulting voltage on plate 22 of tube $T_1$ denoted as $E_{22}$ is indicated in Fig. 8. The greater the value of the voltage peak of Fig. 7 above triggering height, that is, above 6 volts, for example, the greater will be the conflict period in the conductive tube between the tendency of the input voltage on the suppressor grid to decrease the plate current and the tendency of the triggered circuit to increase the plate current resulting in the formation of plateaus which tend to give rise to spurious pulses. The plate voltage $E_{22}$ may vary between +15 volts and +135 volts as indicated, and the voltage change $\Delta E$ available for triggering, that is, the height of the square wave is then about 120 volts as indicated.

Fig. 9 shows the voltage pulses on the grid of preliminary amplifier $A_{1-2}$ after they have been differentiated by the differentiating circuit comprising condenser 23 and resistor 24 causing negative and positive voltage pulses from negative and positive voltage changes of the plate voltage $E_{16-17}$ of Fig. 7. The differentiated pulses shown in Fig. 8 have plateaus not far below their peaks. In accordance with our invention the rising portion of the curves including these plateaus are prevented from being amplified, otherwise they will cause the formation of spurious pulses that will probably result in erroneously high readings. To reduce the effect of these plateaus to a certain extent, a comparatively large condenser, for example, about 25 mf. is used in the differentiating circuit so as to give a large differentiating pulse with a plateau further removed from the peak. In order to obtain a substantially non-distorted amplified pulse of small width, the intermediate amplifier $A_{1-2}$ is biased to such a value that the plateau portion is well below cut-off. For example, if the tube cut-off voltage is —10 volts and the grid is biased to —40 volts then only 1 volt of a 31 volt positive pulse would be above bias and hence amplified. It is not sufficient merely to eliminate plateaus, that is, the intermediate amplifier is biased sufficiently below cut-off as to allow only the peaks of the differentiated pulses extending beyond the dotted horizontal line shown in Fig. 9 to be amplified. By biasing the intermediate amplifier well below cut-off, therefore, the amplified pulse will possess none of the irregularities of the voltage curve of the previous scaling stage, and will provide ideally peaked voltage curves of narrow width. Fig. 10 shows such amplified voltage pulse appearing on the plate of preliminary amplifier $A_{1-2}$ which may be of the order of —100 volts. Fig. 11 shows the differentiated voltage appearing on the suppressor grids of scaling stage $S_2$ which may be of the order of —15 to —20 volts. An important consideration in the selection of values for the components of a differentiating circuit is that the time constant shall be appreciably greater than the width of the plateau so that spurious pulses will not tend to be formed by the differentiating circuit. The above considerations lead to the selection of a differentiating circuit with a comparatively large time constant. Too large a value for the differentiating circuit condenser cannot be used, however, because the impedance will become low enough to prevent triggering of the preceding stage.

As indicated previously, negative pulses on the plate of the interstage amplifier $A_{1-2}$ are differentiated by condenser 23 and resistor 24. The values of condenser 23 and resistor 24 are chosen to obtain narrow pulses that are about two or three times the triggering voltage height of the next stage. The second scaling stage $S_2$ has a 0.02 mf. memory condenser, for example. The best value for the memory condenser is a small value. Smaller values than 0.02 mf. are undesirable because the resolution time of the memory circuit may become shorter than the triggering pulse in which event the circuit will not trigger. Increasing the size of the memory condenser and resolution time of the circuit makes the stage incapable of responding to high frequencies. For these reasons a useful range of condenser size is between 0.01 and 0.1 mf. The pulse frequency must not be so high as to permit more than one pulse during the resolution time of the circuit otherwise the stage will fail to scale. Therefore, the resolution time of the first stage $S_1$ should be made as small as possible because emanations of radioactive samples of even low activity that are generally analyzed by a Geiger-Müller tube are very close together, and may escape counting. A suitable value is 0.01 mf. because of the sharp input pulses, making the stages responsive to high frequency pulses.

The last scaling stage $S_6$ may be connected directly to the preceding scaling stage $S_5$ in a well-known manner, that is, by a coupling condenser 20, as shown. The differentiating circuit between stages $S_5$ and $S_6$ is given a large time constant for supplying a large pulse to the final stage $S_6$. Since the differentiated pulse is somewhat wide, a large memory condenser, such as, for example, 0.1 mf. is used.

The output of the final stages $S_6$ is applied to a differentiating circuit including a 0.1 mf. condenser 40 and resistors 41 and 42, of 2 and 5 megohms respectively, thence to the input grid of a beam power tube 43 such as, for example, a type 6L6. The output of the beam power tube 43 is applied to a recorder (not shown) which is bridged by a 0.01 mf. condenser 44.

Fig. 12 is a circuit showing the power supply unit for providing the B+ and the various negative or C bias voltages for the circuit shown in Fig. 1. Numeral 50 denotes the primary of a transformer energized, for example, by a 110 volt 60 cycle alternating current source, and numerals 51 and 52 denote the secondaries thereof. A full wave rectifier tube 53 of any well-known type, such as type 80, is connected to the secondary winding 52 and thus provides a pulsating direct current to conductor 54, which current is smoothed out by the filter circuit comprising condensers 55, 56, and 57 and inductance coils 58 and 59. Conductor 60, therefore, constitutes the B+ terminal for energizing the parts of the circuit indicated by B+ in Fig. 1. Instead of providing a separate transformer or a separate secondary winding as a source for the negative voltage supply, secondary winding 52 may be used for this purpose by the connections shown. That is, the tube 61, either of the diode type or triode type with grid connected to plate as shown, gives a rectified or D. C. voltage that is applied across a gas-filled voltage regulating tube 62 and current limiting resistor 63. Tube 62 and resistor 63 are shunted by filter condenser 64. It will be seen, therefore, that any tendency for the voltage appearing across tube 62 to change, such as may be caused by fluctuations in the voltage supply source energizing the primary winding 50, will result merely in a change of the current value in tube 62 with no change of voltage thereacross. In this manner the voltage across resistor 66 is always maintained at a constant value. By providing suitable taps on resistor 66, different values of negative voltage may be selected for applying the necessary negative or C bias voltage to the scaling circuit shown in Fig. 1, indicated by C, —10 v.; C, —40 v. and C, —60 v., respectively. It will be noted that conductor 54a of Fig. 1, which is connected to the recorder, is energized by conductor 54 rather than by the B+ terminal so that fluctuations produced by the recorder will not be filtered by circuit 55 to 59, inclusive and therefore will not cause appreciable fluctuation of the B+ supply voltage.

It will be seen, therefore, that we have provided an efficient multiple scaling circuit that is relatively stable and that does not tend to get out of adjustment, and in which a desired shape of voltage pulse may be selected for translation between successive stages so as to prevent the transmission of poorly shaped triggering pulses that may fail to trigger succeeding stages, and to prevent the transmission of spurious pulses that would otherwise result in an erroneously high pulse count.

It should be noted that the particular multiple stage scaling circuit illustrated is merely by way of example and that other circuits with a different number of stages or with slightly different values for the component parts or having equivalent circuit components may be used. Likewise, other modifications will be readily suggested to those skilled in the art, after having had the benefit of the teachings of our invention. For this reason, our invention should not be limited except insofar as set forth in the following claims.

We claim:

1. In combination with a current source that develops pulses, a plurality of scaling stages connected in cascade, the triggering voltage pulses applied to said stages being controlled by the output of said source, each scaling stage comprising a pair of pentode tubes, each tube having an anode, cathode, control grid, screen grid and suppressor grid, said suppressor grids of each pentode pair being interconnected, the plate of each tube of said pentode pair being connected to the screen grid of the other tube, said tubes being alternately triggered and translating a single pulse for every two successive pulses appearing at the input of the scaling stage formed thereby, a memory circuit interconnecting the cathodes of said tube pairs and maintaining the bias of the non-conducting tube at a value below that of the conducting tube during triggering action, and intermediate amplifiers connected between successive scaling stages, each intermediate amplifier including a differentiating circuit in its input circuit, and being biased to clip the greatest maximum of each differentiated pulse and transmit it to the following scaling circuit.

2. In combination, a plurality of scaling stages connected in cascade, each scaling stage comprising a pair of pentode tubes, each tube having an anode, cathode, control grid, screen grid and suppressor grid, said suppressor grids of each pentode pair being interconnected, the plate of each tube of a pair being connected to the screen grid of the other tube of that pair, said tubes being alternately triggered and translating a single pulse for every two successive pulses appearing at the input of the scaling stage formed thereby, a memory circuit including a condenser having a value between 0.01 and 0.10 mf. interconnecting the cathodes of said tube pairs and maintaining the bias of the non-conducting tube at a value below that of the conducting tube during triggering action, and intermediate amplifiers connected between successive scaling stages, each intermediate amplifier including a differentiating circuit in its input circuit, and being biased to clip the greatest maximum of each differentiated pulse and transmit it to the following scaling stage.

3. In combination, a plurality of scaling stages connected in cascade, each scaling stage comprising a pair of pentode tubes, each tube having an anode, cathode, control grid, screen grid and suppressor grid, said suppressor grids of each pentode pair being interconnected, the plate of each tube of said pentode pair being connected to the screen grid of the other tube, said tubes being alternately triggered and translating a single pulse for the stage for every two successive pulses appearing at the input of the scaling stage formed thereby, a memory circuit interconnecting the cathodes of said tubes and maintaining the bias of the non-conducting tube at a value below that of the conducting tube during triggering action, and intermediate amplifiers conected between successive scaling stages, each intermediate amplifier including a differentiating circuit in its input circuit, and being biased to clip the greatest maximum of each differeniated pulse and transmit it to the following scaling stage.

4. In combination, a plurality of scaling stages connected in cascade, each scaling stage comprising a pair of pentode tubes, each tube having an anode, cathode, control grid, screen grid and suppressor grid, said suppressor grids of each pentode pair being interconnected, the plate of each tube of said pentode pair being connected to the screen grid of the other tube, said tubes being alternately triggered and translating a single pulse for the stage, for every two successive pulses appearing at the input of the scaling stage formed thereby, a memory circuit interconnecting the cathodes of said tubes and maintaining the bias of the non-conducting tube at a value below that of the conducting tube during triggering action, and intermediate amplifiers connected between successive scaling stages, comprising double triode tubes for three successive stages, each triode section acting as the intermediate amplifier between two successive stages and each intermediate amplifier having a differentiating circuit in its input circuit, and being biased to clip the greatest maximum of each differentiated pulse and transmit it to the following scaling stage.

5. A scaler comprising a plurality of scaling stages, each scaling stage consisting of an amplifier and a triggering circuit, said triggering circuit including a pair of vacuum tubes, each tube having an anode, cathode, control grid, screen grid and suppressor grid, said suppressor grids of each tube pair being interconnected, the plate of each tube of said pair being connected to the screen grid of the other tube, said tubes being alternately triggered and translating a single pulse for every two successive pulses appearing at the input of the scaling stage.

6. A scaling circuit comprising the elements of claim 5 and a memory circuit interconnecting the cathodes of the two pairs and maintaining the bias of the non-conducting tube at a value below that of the conducting tube during triggering action.

7. A triggering circuit ocmprising, in combination, a pair of pentode tubes, each tube having an anode, cathode, control grid, screen grid and suppressor grid, said suppressor grids being interconnected, the plate of each tube of said pentode pair being connected to the screen grid of the other tube, said tubes being alternately triggered and translating a single pulse for every two successive pulses apearing at the input of said pair.

8. A triggering circuit comprising the elements of claim 7 and a memory circuit interconnecting the cathodes of said two pairs and maintaining the bias of the non-conducting tube at a value below that of the conducting tube during triggering action.

BENJAMIN SCHLOSS.
SIDNEY ROBINSON.

REFERENCES CITED

The following references are of record in the file of this patent:

UNITED STATES PATENTS

| Number | Name | Date |
| --- | --- | --- |
| 2,381,920 | Miller | Aug. 14, 1945 |
| 2,398,097 | Kent | Apr. 9, 1946 |
| 2,409,689 | Morton et al. | Oct. 22, 1946 |

OTHER REFERENCES

Lipschutz and Lawson: "A Triode Vacuum Tube Scale-of-Two Counter," "Review of Scientific Instruments," March 1938.

Article, "A Complete Geiger-Müller Counting System," by Harold Lifschutz from January 1939 Review of Scientific Instruments, vol. 10, pages 21–26.